Dec. 11, 1956 J. C. BURKHOLDER 2,774,028
TIMER
Filed Sept. 30, 1955 2 Sheets-Sheet 1

Inventor
JOHN CHARLES BURKHOLDER
By~ Fetherstonhaugh & Co
Att'ys

Inventor
JOHN CHARLES BURKHOLDER

United States Patent Office 2,774,028
Patented Dec. 11, 1956

2,774,028

TIMER

John C. Burkholder, Toronto, Ontario, Canada

Application September 30, 1955, Serial No. 537,835

4 Claims. (Cl. 320—23)

This invention relates to a timer for battery chargers and to a battery charging method and means, wherein the complete time period of operation is comprised of one interruptable maximum time interval joined to and followed by a constant time interval.

In the charging of batteries the whole charging period may be of the order of seven to twelve hours. It is desirable, however, to finish the charging of a battery at a lower charging rate.

This invention provides a system whereby when both the charging source and the battery are disconnected, the system presets itself to be ready to provide the sequence of interruptable charging rate charging and constant finish rate charging required when a charging source and a battery are connected. When the finish rate charging is completed the source is automatically disconnected but the system is not allowed to reset (or preset) until the battery itself is disconnected. The state of the overall system when both battery and source are disconnected is referred to as "de-energized."

In accord with the invention, a battery charge control system is provided which is adapted to connect a source of direct current through either a charge rate circuit or a finish rate circuit to the battery. The system is biased when de-energized toward the charge rate circuit connection when de-energized, but energization may be provided by either the source or a battery with a predetermined amount of charge. Means are provided for switching the charge rate circuit to the finish rate circuit when a sufficient charge is achieved on the battery (approximately 80–95 percent of the desired charge) or on the elapsing of a predetermined interval, thus providing the "interruptable maximum time interval" referred to. The second switching means is provided to avoid damage through a continual charging rate current application to a battery which will not charge or to a battery during a failure of the charge determining relay. When the finish rate circuit is connected, a timer is adapted to switch off the source at the end of the predetermined interval but the system is kept biased to the finish rate circuit connection until the battery also is disconnected.

The timer providing the sequence of operation incorporates an element movable between a stop position and a limit switch position, biased toward the stop position. This timer measures the charge rate interval. A second timer also comprises an element movable between a stop position and a limit switch position and biased toward the stop position. Drive means are provided for each element to drive it from the stop toward the limit switch position and each drive is connected to its respective element by a clutch which acts as a control element.

In drawings which illustrate embodiments of the invention:

Figure 1:
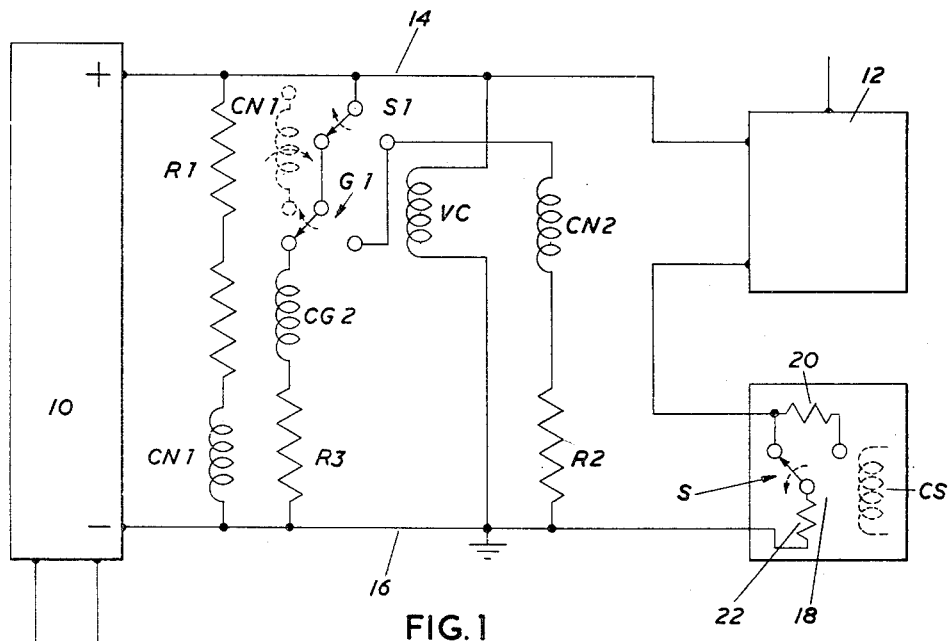
Figure 1 shows the direct current portion of the charging control system.

In Figure 1 a suitable direct current source 10 (preferably a rectifier) is connected to a battery 12 by positive lead 14 and negative lead 16. Negative lead 16 provides alternate paths depending on the position of a shunt switch S with the dotted arrow showing the bias direction. The shunt switch S shorts out a resistance 20 so that the negative path will go through a resistance 22 while the opening of the shunt switch S directs the charge current through both resistances 20 and 22. The circuit thus provides a charge rate circuit when only resistance 22 is connected in the charge circuit and a finish rate circuit when both resistances are connected in series. The charge and finish rate circuit are merely shown schematically and may be arranged in any desired way. The direct current control system as shown in Figure 1 is as follows:

A microswitch S1 has its common terminal connected to the positive line 14 and its normally closed connection to the common terminal of a charge measuring relay G1, the biasing direction being shown by the dotted arrow. The normally open contact of switch S1 is connected through a clutch coil CN2 of a timer motor 2 and a resistance R2 to the negative connection. Relay G1 has a normally closed and a normally open connection, the biasing direction being shown by the dotted arrow, the normally closed connection being connected through relay coil CG2 of a relay G2 and resistance R3 to the negative line. The normally open contact of relay G1 is connected to normally open contact of relay S1 so that both are connected through clutch coil CN2 to ground. Also connected across the direct current line is resistance R1 in series with clutch coil CN1 for timer 1 and connected across the direct current line is the voltage coil VC for the charge measuring relay G1.

The resistances R1, R2, R3 are protections for the coils connected thereto and are adjustable.

Figure 2:
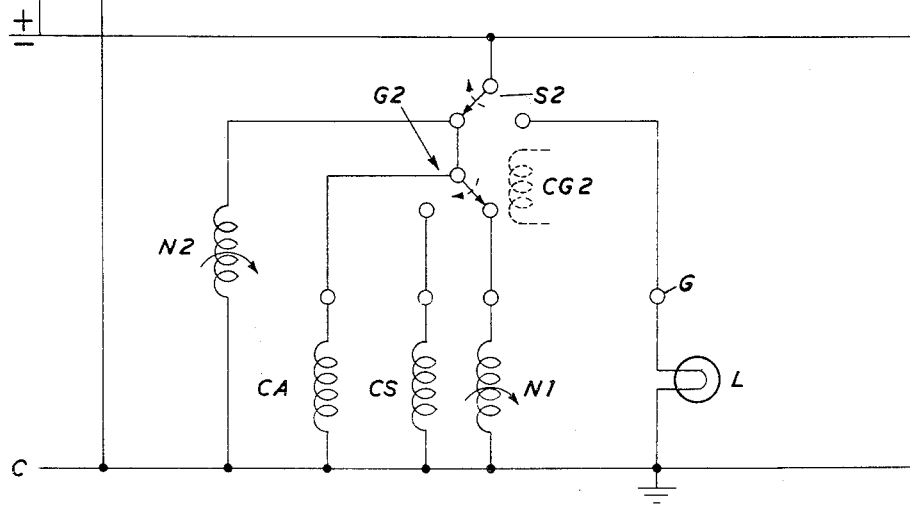
Figure 2 shows the alternating current portion of the charging control system.

Referring now to Figure 2 where the alternating current circuit is shown, the common terminal of a microswitch S2 is connected to the positive negative (+−) line while the normally closed contact of this switch S2 is connected through a motor winding N2 to ground. The normally closed contact of the switch S2 is also connected to the common terminal of a relay G2, the biasing direction being shown by the dotted arrow. The normally open contact of the relay G2 is connected through motor winding N1 to ground. The normally closed contact G2 is connected through relay coil CS to ground. Switch S may be any convenient means for disconnecting the shunt past resistance 20 so that resistances 20 and 22 are connected in series to the battery and the finish rate rather than the charge rate is applied thereo. The normally closed contact of micro-switch S2 is also connected through a coil CA to ground. The coil CA is adapted when deenergized to operate switching means (not shown) to disconnect the alternating current and direct current supplies. Such switching means is biased toward the "off" position for the direct current and alternating current supplies so that such supplies are "off" when coil CA is de-energized. Coil CG2 which is shown in position in Figure 1 is also shown dotted in Figure 2 to illustrate its effect on the movable contact of relay G2. The normally open contact of switch S2 is connected to a light L to indicate the disconnection of the source 10.

Figure 3:
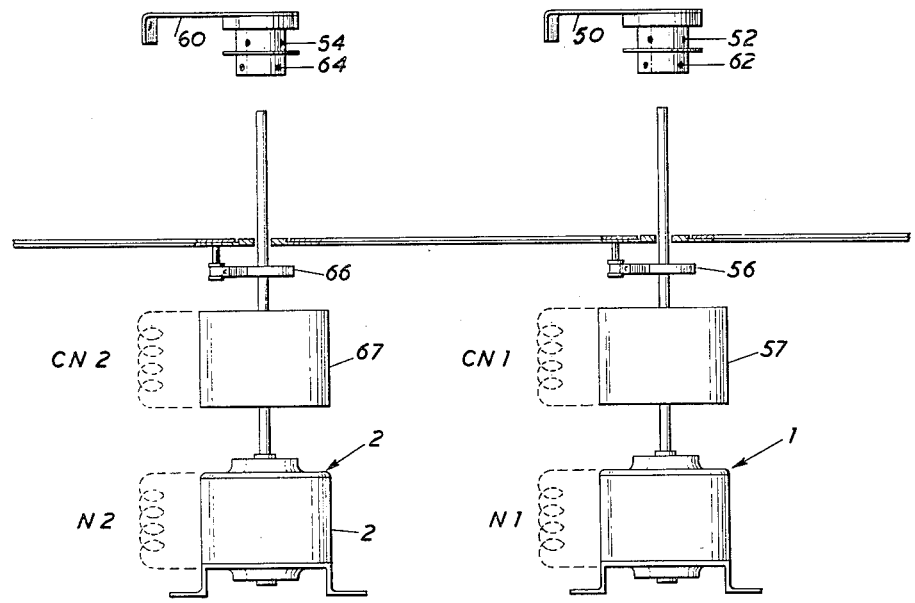
Figure 3 shows the function of the clutch connection.
Figure 4:
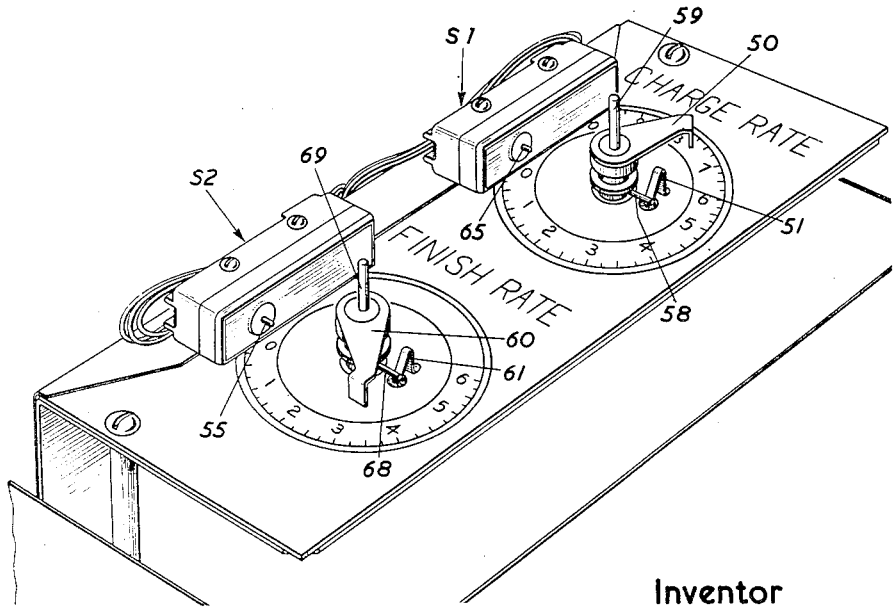
Figure 4 shows the timing elements.

Turning now to Figure 3 the timing means are shown as two synchronous motors 1 and 2 connected through clutch means 57 and 67; microswitch actuating arms 50 and 60 rigidly connected to shafts 59 and 69 respectively. Actuating arms 50 and 60, when the clutches are disengaged, are biased by springs 56 and 66 until adjustable stop arms 58 and 68 contact stops 51 and 61 respectively. Microswitch control stop arms 58 and 68 are also rigidly attached to their respective shafts 59 and 69 but the angular displacement between the arms 50 and 60 and the stop arms 58 and 68 are made adjustable by set screws 52, 62, 54 and 64 so that the time of operation of the two timers is adjustable. Timer 1 is the charge rate timer; timer 2 is the finish rate timer. The actuating arms 50 and 60 are biased toward the stop members 51 and 61, while at the finish position is located in the path of the movable element the actuating plunger 55 and 65 for the movable contacts of the microswitches S1 and S2 respectively. The clutch coil CN1 which actuates clutch 57 for the charge rate timer N1 is energized by the circuit shown in Figure 1, while the clutch CN2 which actuates clutch 67 for the finish rate timer is connected also as shown in Figure 1. The clutches 57 and 67 may be operated through any known means by the clutch coils CN1 and CN2. Coils CN1, CN2, and motor coils N1, N2 are schematically indicated in Figure 3 to indicate their relationship to the physical parts there shown. The operation of the invention is as follows, it being assumed that the alternating current line is connected as shown in Figure 2.

When a battery is to be charged the circuit will have the source 10 disconnected and no battery will be in position. Thus with arm 50 at the stop position switch S1 will be as shown in Figure 1 with the movable contact connected to G1. Relay G1 will be in the position shown in Figure 1, since there is no battery charge to energize the coil VC. Switch S2 will be in the position shown in Figure 2 since clutch CN2 is not energized and timer arm 60 will be in the stop position since the de-energization of the clutches 57, 67 allows the biasing means to rotate arms 50, 60 to this position.

When battery 12 and source 10 are connected, switching means S being normally closed, clutch CN1 is immediately energized to actuate clutch 57 connecting the charge timer arm 50 to the motor 1. Relays S1 and G1 remain in their normal positions, the latter since there is no charge built up on the battery as yet to sufficiently energize the relay coil VC. Connecting the alternating source immediately energizes the motor coil N2 but since clutch coil CN2 is not energized, the timer arm 60 for the finish timer does not move. The switching coil CS connected to the normally closed terminal of switch G2 is immediately de-energized on connection of the direct current source by the energization of coil CG2 moving the arm of relay G2 against the bias so that switching means S keeps the charge rate circuit connected.

The charging operation therefore begins at the charge rate and the charging at this rate is normally terminated by the charge in the battery reaching its sufficient value (usually from 85 percent to 95 percent of the charge) to energize charge coil VC and switch the relay arm G1 against the bias which simultaneously energizes clutch CN2 and de-energizes relay G2. The consequent de-energization of coil CG2 allows the relay G2 to move under its bias and energize the coil CS which switches switching means S to put resistance 20 in series with resistance 22 and therefore to switch the system from the charge circuit to the finish circuit. The energization of the clutch CN2 initiates operation of the finish timer motor 2 which times the application of the finish charge rate. If the charging relay G1 is not operated by coil VC within a predetermined time then the microswitch S1 is switched by arm 50 and timer 1 to perform the same function as would have been performed by the charge relay G1 if the coil VC had indicated an 80-95 percent charged battery. That is, the movement of the switch S1 operates to energize coil CN2 and to de-energize relay G2.

It will thus be seen that the relays S1 and G1 actually are a single relay with alternate, actuating or switching means. They comprise in practice, two relays because of the expense of providing a relay with double actuating features.

When the finish rate time is completed switch S2 is moved by the timer arm 60 and lights a light connected to the terminal G. Moreover, switching coil CA is de-energized to disconnect alternating current and direct current supplies. Switching coil CS is also de-energized to allow switch S to move under its bias and switch the system back to the charge circuit ready for the next operation. Both timer motor windings N1 and N2 are also now disconnected. However, due to the fact that the battery is still connected to the direct current line, clutch coil CN1 remains energized to maintain the arm 50 in its limit switch position so that the switch S1 maintains clutch coil CN2 energized. In fact with either S1 or G1 to the right in Figure 1, clutch coil CN2 is energized to perform the same function in relation to arm 60 and switch S2. If it were not for this fact, the switches S1 and S2 would return to their normal position and the return of switch S2 would energize switching means CA and reconnect the power supplies causing undesired charging of the battery. Thus the arrangement of this invention allows the charging system to remain in its final position, the charging means having been disconnected until the battery is taken from the charger. As soon as the battery is taken from the charger the clutch coils CN1, CN2 are de-energized and the timer arms 50 and 60 return to their normal position allowing switches S1, S2 to assume their normal positions and the circuit as a whole responds to its biasing means to set the system up for the next battery connected.

I claim:

1. A battery charger control system energizable by a direct current source or by a battery having a predetermined charge providing a charge rate circuit and a finish rate circuit for such battery, direct current supply means for charging said battery, said system being biased toward said charge rate circuit when de-energized, means for switching from said charge rate circuit to said finish rate circuit, responsive to a predetermined battery charge or a predetermined charge time, means to disconnect said direct current supply in response to a predetermined finish rate time, said means being operable to reconnect said direct current supply only on de-energization of said system.

2. A timer for a battery charger control system comprising: a first timer including an element movable between a stop position and a limit switch position, biased toward said stop position; a second timer including an element movable between a stop position and a limit switch position, biased toward said stop position; drive means for each of said timers adapted to drive said element toward said limit switch position; clutch means respectively connecting each of said drive means and their respective elements; means responsive to the connection of a charging source to said system for causing the concurrent engagement of said first timer clutch and said first timer drive means; means responsive either to the achievement of a predetermined charge on a battery connected to said system or to the arrival of said first timer element at said first limit switch position to cause concurrent engagement of said second timer clutch and said second timer drive means; and means responsive to the arrival of said second element at said second limit switch position to disconnect said source.

3. A timer as claimed in claim 2 wherein said first clutch and second clutch are connectable in response to either the connection of said source to said system or the connection of a battery having a predetermined charge to said system.

4. A timer as claimed in claim 2 wherein said clutches are disconnected by the disconnection of both said source and such battery.

References Cited in the file of this patent

UNITED STATES PATENTS

| 1,937,738 | Vencill | Dec. 22, 1931 |
| 2,227,118 | Amsden | Dec. 31, 1940 |
| 2,272,745 | Hinds et al. | Feb. 10, 1942 |
| 2,635,689 | Hall | Apr. 21, 1953 |
| 2,670,039 | Burkholder | Feb. 23, 1954 |
| 2,674,212 | Hall | Apr. 6, 1954 |